United States Patent [19]

Nakamura et al.

[11] 4,437,532
[45] Mar. 20, 1984

[54] STEERING FORCE CONTROLLER FOR A POWER STEERING DEVICE

[75] Inventors: Keiichi Nakamura, Kariya; Kyosuke Haga, Anjo; Yutaka Mori, Toyokawa, all of Japan

[73] Assignee: Toyoda Koki Kabushiki Kaisha, Kariya, Japan

[21] Appl. No.: 393,350

[22] Filed: Jun. 29, 1982

[30] Foreign Application Priority Data

Jul. 13, 1981 [JP] Japan .................. 56-109644

[51] Int. Cl.³ .............................................. B62D 5/06
[52] U.S. Cl. ..................................... 180/142; 180/143
[58] Field of Search ........................ 180/141, 142, 143

[56] References Cited

U.S. PATENT DOCUMENTS 3,866,706  2/1975  Lincke et al. ..................... 180/142
4,300,650  11/1981 Weber ............................... 180/142

FOREIGN PATENT DOCUMENTS 54-14368  6/1978  Japan .
53-32129  9/1978  Japan .

Primary Examiner—Joseph F. Peters, Jr.
Assistant Examiner—D. Lynn Fugate
Attorney, Agent, or Firm—Oblon, Fisher, Spivak, McClelland & Maier

[57] ABSTRACT

A steering force control device for a power steering device, wherein various inputs including input and output torques respectively applied to and generated by the power steering device are detected and input to a digital computer. The computer selects one of plural objective output torque values stored in a memory device based upon the various inputs except for the output torque and then, calculates a control output value based upon the detected output torque and the selected objective output torque. The calculated control output value is applied to a linear solenoid valve which is provided in a fluid system of the power steering device, whereby the output torque generated by the power steering device is controlled to follow the selected of the objective output torques.

8 Claims, 8 Drawing Figures

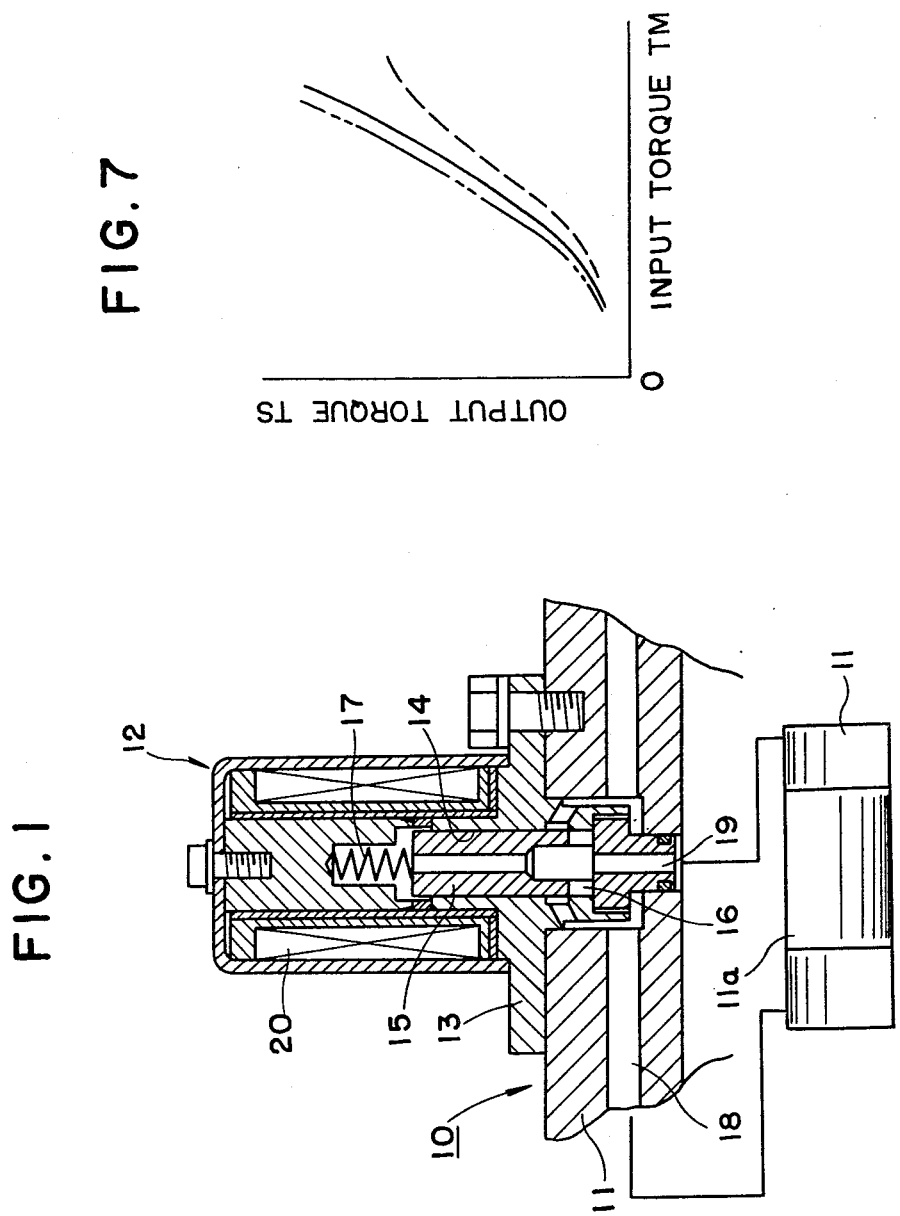

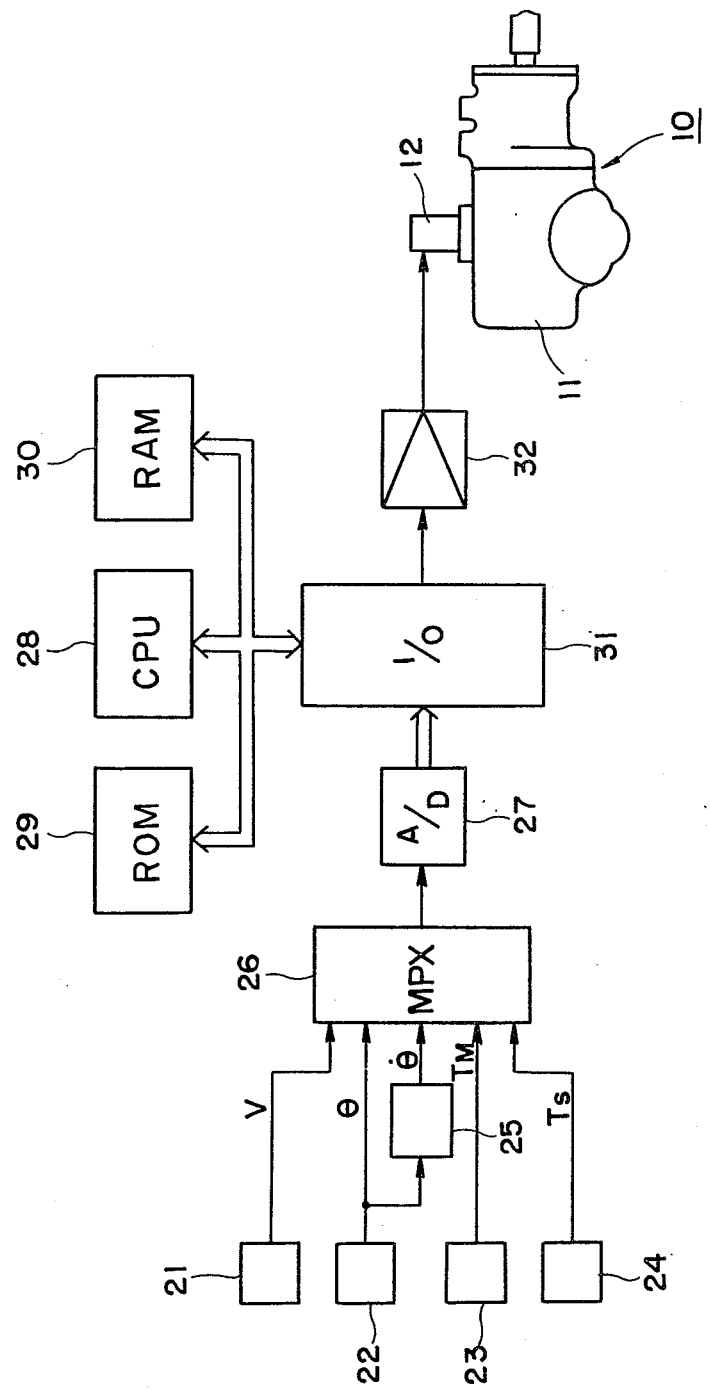

STEERING FORCE CONTROLLER FOR A POWER STEERING DEVICE

BACKGROUND OF THE INVENTION

1. Field of the Invention

The present invention relates to a steering force controller for controlling a steering force generated by a power steering device by the utilization of a control circuit such as, for example, a microcomputer.

2. Description of the Prior Art

It has been known heretofore to change the steering force or the output torque relative to the input torque, of a power steering device based upon various parameters such as vehicle speed, steering rotary angle, lateral acceleration and so forth. In a known steering force controller for a power steering device, vehicle speed, steering rotary angle, lateral acceleration and so forth are detected by respective sensors, whose outputs are then processed to calculate a control electric current. This control electric current is applied to a linear solenoid valve for controlling steering force, whereby a part of pressurized fluid is controllably bypassed from a high pressure passage directly to a low pressure passage so as to change the volume of pressurized fluid to be supplied into the power steering device.

However, in the known steering force controller, no output torque is detected, resulting in the fact that the output torque cannot be controlled relative to the input torque to follow an objective characteristic even when electric current suitable to cause the output torque to follow the objective characteristic is applied to the solenoid valve. Particularly, once a disturbance causes the output torque to deviate from the objective characteristic, such deviation cannot be obviated, and therefore, the control system is unstable.

SUMMARY OF THE INVENTION

Accordingly, it is an object of the present invention to provide an improved steering force controller capable of realizing an optimum steering force control by detecting input and output torques of a power steering device and at least one other control input and by controlling the actual steering characteristic, determined by the detected input and output torques, to follow an objective steering characteristic which is predetermined taking into account of the one other control input.

Briefly, according to the present invention, there is provided a steering force controller, including an input torque sensor, an output torque sensor for detecting an output torque generated by a power steering device, and at least one auxiliary input sensor for detecting an auxiliary input independent of the input and output torques, wherein steering force is controlled in relation to the detected output torque in addition to the input torque applied to the power steering device and the output of the auxiliary sensor. More particularly, a control circuit device is provided, which obtains an objective output torque value based upon the detected input torque value and the detected auxiliary input value. The control circuit device calculates a control value based upon the objective output torque value and the detected output torque value and outputs the calculated control value to a solenoid drive circuit for controlling a linear solenoid valve which is provided in a fluid control system of the power steering device. Since the control value applied to the solenoid drive circuit is calculated as a result of comparing the actual output torque value with the objective output torque value, the output torque generated by the power steering device is controlled to follow the objective output torque value.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which:

FIG. 1 is a longitudinal cross-sectional view of a linear solenoid valve used in the present invention;

FIG. 2 is a block diagram of a steering force controller for a power steering device according to the present invention;

FIG. 7 is a graph illustrating an input-output characteristic of the power steering device.

DETAILED DESCRIPTION OF THE PREFERRED EMBODIMENT

Figures 3A, 3B:
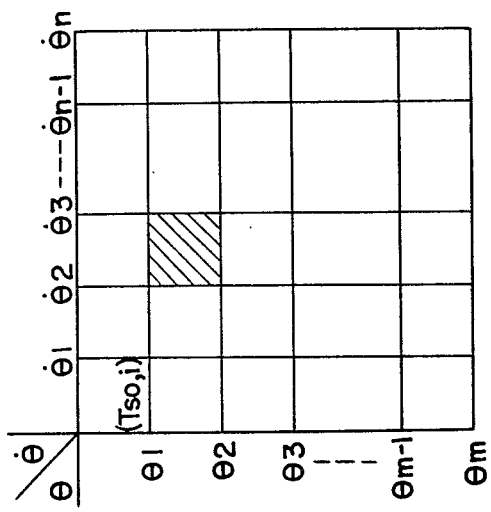
FIGS. 3(A) and 3(B) are explanatory charts illustrating memory organization for storing objective output torque data and associated control current data in a read-only memory shown in FIG. 2.

Referring now to the drawings, wherein like reference numerals or characters refer to identical or corresponding parts throughout the several views, and more particularly to FIG. 1, there is shown a power steering device 10 including a valve housing containing therein a known servo valve, not shown, and a power cylinder 11 receiving a piston 11a. A linear solenoid valve 12 is provided on the power cylinder 11 for controlling the communication and shut-off between the cylinder chambers of the power cylinder 11. The linear solenoid valve 12 includes a valve housing 13 formed with an internal bore 14, into which a spool 15 is slidably received. The spool 15 is provided with a bypass slit 16 and is normally held at its lower end position by means of a spring 17 to shut off the communication between a port 18 leading to the left cylinder chamber of the power cylinder 11 and a port 19 leading to the right cylinder chamber of the power cylinder 11. However, when the spool 15 is moved upwardly against the spring 17 in accordance with electric current applied to a solenoid 20, the ports 18 and 19 communicate with each other through the bypass slit 16. Accordingly, a steering force is changed depending upon displacement of the spool 15, which in turn depends on the electric current applied to the solenoid 20.

Referring now to FIG. 2, which shows a control circuit for controlling the linear solenoid valve 12, reference numeral 21 indicates a sensor for detecting a vehicle speed V, 22 indicates a sensor for detecting a rotary angle $\theta$ of a steering wheel, 23 indicates a sensor for detecting an input torque (steering wheel torque) TM, 24 indicates a sensor for detecting an output torque TS, and 25 indicates a differentiation circuit for differentiating an output of the rotary angle sensor 22 to output a signal responsive to a rotary speed $\dot{\theta}$ of the steering wheel. Analog outputs detected by these sensors 21 to 24 and the differentiation circuit 25 are applied to a multiplexer 26 to be selected on a time sharing basis and then input to an analog-to-digital converter 27 to be converted into respective digital values. It is to be noted here that the steering wheel rotary speed $\dot{\theta}$ can also be obtained by computer software for differentiating the output of the rotary angle sensor 22 after having been converted by the A-D converter 27.

Reference numeral 28 indicates a central processing unit (CPU) formed of a microcomputer for performing digital arithmetic processing, 29 indicates a read-only memory (ROM) for storing fixed programs, which are described in detail hereinafter, 30 indicates a random access memory (RAM), and 31 indicates an interface circuit. This interface circuit 31 receives a signal from the A-D converter 27 to apply the same to the CPU 28. The interface circuit 31 also performs a duty cycle control of electric current to be applied to the linear solenoid valve 12 in response to a signal from the CPU, as will be described hereinafter, and applies its output to the solenoid 20 through an amplifier 32.

FIGS. 3A and 3B show fixed programs stored in the ROM 29. An objective output torque TSO relative to an input torque TM is programmed in a matrix in accordance with respective input torque TM, vehicle speed V, steering wheel rotary angle $\theta$ and steering wheel rotary speed $\dot{\theta}$. More specifically, input torque TM, vehicle speed V, steering wheel rotary angle $\theta$ and steering wheel rotary speed $\dot{\theta}$ are respectively divided into plural areas. As shown in FIG. 3(A), a plurality of data tables (00), (01), (02) . . . are allotted in accordance with relationship (TMj, Vj) between the input torque TM and the vehicle speed V. As shown in FIG. 3(B), in each of the data tables (00), (01), (02) . . . , a plurality of areas are allotted in accordance with relationship ($\dot{\theta}$j, $\theta$j) between the steering wheel rotary speed $\dot{\theta}$ and the steering wheel rotary angle $\theta$, and an objective output torque TSO and a reference electric current i are programmed in each area. These data for objective output torque TSO and the reference electric current i are set by experience in the following manner.

A basic characteristic (solid line in FIG. 7) of the objective output torque TSO relative to the input torque TM is set in accordance with TM-TS characteristic (two-dot-and-dash-line in FIG. 7) determined by the initial design factors so as to render the vehicle slightly heavier with respect to the steering action. The objective output torque TSO is set to be smaller (TSO−ΔTSO) than the basic characteristic value in order to improve the steering stability as the vehicle speed V increases. On the other hand, the objective output torque TSO is set to be larger (TSO+ΔTSO) than the basic characteristic value in order to improve the steering response as the steering wheel rotary speed $\dot{\theta}$ increases. The objective output torque TSO is also determined in accordance with the TM-TS characteristic in case where the vehicle speed V is zero or the steering wheel rotary angle $\theta$ is maximum.

Accordingly, assuming now that the input torque TM, the vehicle speed V, the steering rotary angle $\theta$ and the steering rotary speed $\dot{\theta}$ are respectively in the ranges of TM1<TM<TM2, V2<V<V3, $\theta$1<$\theta$<$\theta$2 and $\dot{\theta}$2<$\dot{\theta}$<$\dot{\theta}$3, there are read out the objective output torque value TSO and the reference current value i which have been stored in the obliquely lined area of the data table shown in FIG. 3(B). The read-out objective torque value TSO is an optimum value of output torque to be generated in the above-assumed driving condition, and the reference current value i is a nominal electric current value required to attain the objective output torque value TSO.

The above-described method, in which a plurality of objective output torque values TSO corresponding respectively to various input torque values TM are programmed in the form of a matrix, makes it easy to obtain a complicated characteristic, while requiring the ROM 29 of an increased capacity. Therefore, a substitutive method may be used wherein a predetermined functional equation is stored for use in calculating an objective output torque value based upon control input data.

Figure 4:
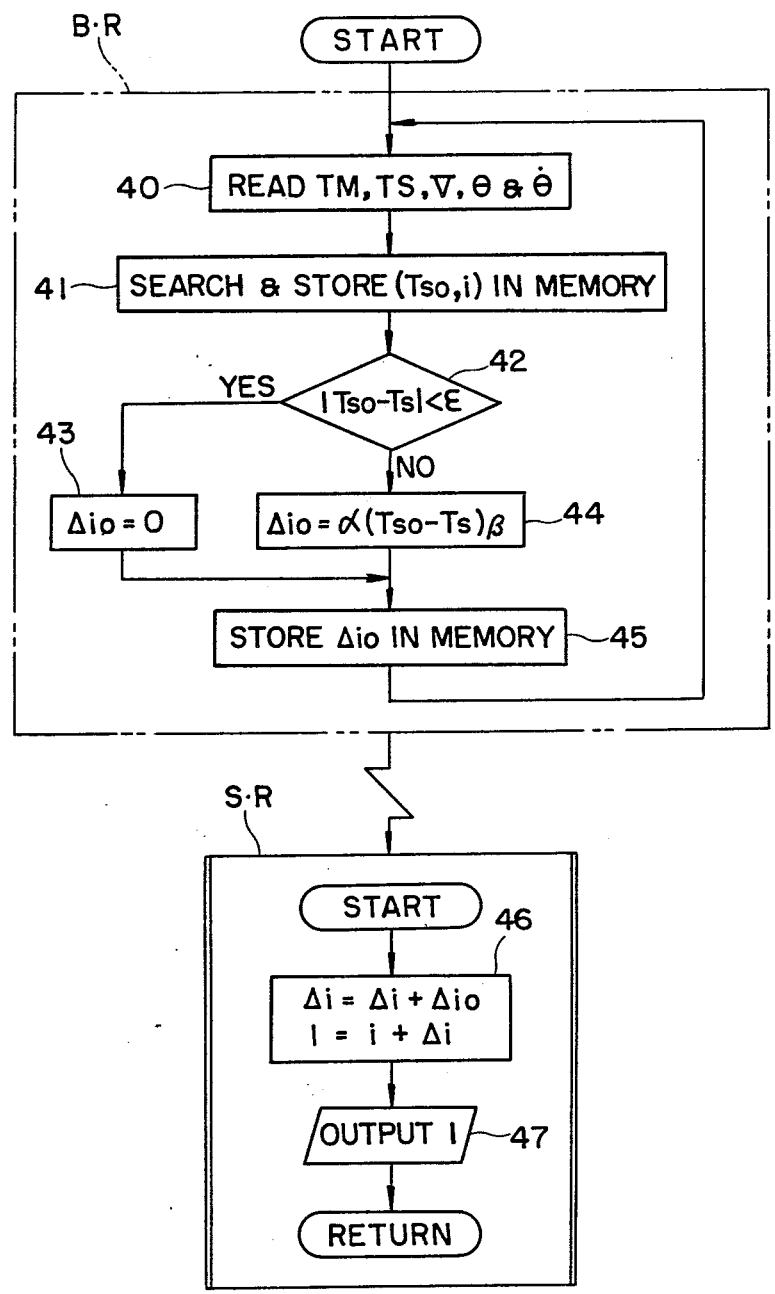
FIG. 4 is a flow chart of a program for a digital computer shown in FIG. 2.

A control program will be described hereinafter with reference to FIG. 4. Each of control inputs, namely input torque TM, output torque TS, vehicle speed V, steering rotary angle $\theta$ and steering rotary speed $\dot{\theta}$ which change momentarily is detected by a corresponding one of the sensors 21–25 and is filtered to be nullified when reaching either of extremely large and small values which have been predetermined for each of the control inputs. Each of these control inputs is added several times to obtain the average value thereof which is then stored in the RAM 30. Therefore, it is to be understood that the control inputs (TM, TS, V, $\theta$ and $\dot{\theta}$) as referred to in the following description mean the respective average values.

The execution of the control program is started upon power being supplied to the CPU 28, and a base routine of the program is firstly executed. That is, in step 40, control inputs of the input torque TM, the output torque TS, the vehicle speed V, the steering rotary angle $\theta$ and the steering rotary speed $\dot{\theta}$ are successively read into associated buffer registers, not shown. In step 41, an objective output torque value TSO and a reference current value i are selectively read out from the fixed program shown in FIGS. 3A and 3B based upon the read control inputs TM, V, $\theta$ and $\dot{\theta}$ to be stored in the RAM 30. Step 42 is then executed to ascertain whether the difference between the actual output torque TS detected in step 40 and the objective output torque value TSO exceeds a tolerance $\epsilon$. When the difference is smaller than the tolerance $\epsilon$, a compensating value $\Delta$io is set to be zero in step 43.

When the difference between the objective output torque value TSO and the actual output torque TS is larger than the tolerance $\epsilon$, step 44 is reached, wherein the compensating value $\Delta$io corresponding to the difference is calculated in accordance with the following equation.

$$\Delta io = \alpha(TSO-TS)\beta$$

The values $\alpha$ and $\beta$ in this equation may be constants or may be values calculated from functional equations which include the control inputs TM, V, $\theta$ and $\dot{\theta}$ as their parameters. The calculated compensating value $\Delta$io is stored in the RAM 30 in step 45, whereafter return is made to step 40, so that the above-described processing steps B-R are repeated while supply of power is maintained.

Figure 6:
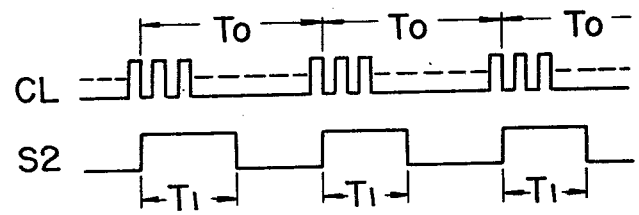
FIG. 6 is a timing diagram illustrating signals shown in FIG. 5.

A subroutine S-R is initiated from step 46 when a hard wired timer circuit, not shown, provided in the interface circuit 31 applies an interruption signal to the central processing unit 28 at a predetermined time interval To shown in FIG. 6. In step 46, the compensating value $\Delta$io stored in the RAM 30 in the above-noted step 45 is referenced to in order to calculate a new compensating value $\Delta i$ in accordance with the following equation.

$$\Delta i = \Delta i + \Delta io$$

Further, the following equation is used to calculate a control current value I based upon the calculated new compensating value $\Delta i$ and the reference current value i which was stored in the RAM 30 in step 41.

$$I = i + \Delta i$$

The control current value I calculated using the above equation is output in step 47. The processing is then returned to the step of the base routine in which the interruption was applied, whereby the base routine is repeatedly executed until a new interruption is applied.

As the linear solenoid value 12 is controlled based upon the control current I obtained in the foregoing manner, the output torque TS relative to the input torque TM is controlled to follow the objective output torque value TSO. Subsequently, when it is ascertained in step 42 that the difference between the new output torque TS and the objective output torque TSO is still larger than the tolerance $\epsilon$, a new compensating value $\Delta io$ corresponding to the difference is calculated in step 44 in the same manner as described above. When the next interruption causes the execution of the step 46, the new compensating value $\Delta io$ is added to the previous compensating value $\Delta i$, whereby the control current I output in step 47 is changed. In this manner, the output torque TS relative to the input torque TM is controlled to follow the objective output torque value TSO.

Figure 5:
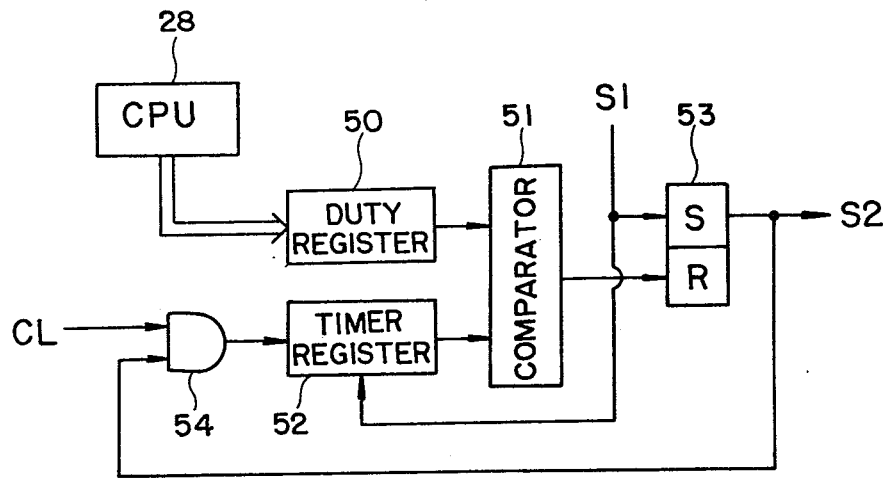
FIG. 5 is a block diagram of a solenoid drive circuit provided in an interface circuit shown in FIG. 2.

FIG. 5 shows a solenoid drive circuit provided in the above-noted input output interface circuit 31. The control current value I calculated by the CPU 28 is input to a duty register 50 at the predetermined time interval To and further, to a comparator 51. An output from a timer register 52 is also input to the comparator 51, which resets a flip-flop 53 when outputting a coincidence signal. A set output signal S2 from the flip-flop 53 is supplied to an AND gate 54 which receives a train of clock pulses CL shown in FIG. 6. The output of the AND gate 54 is input to the timer register 52. The flip-flop 53 is set each time it receives a signal S1 which is generated as every N-th clock pulse of the train of the clock pulses CL, and accordingly, at the predetermined time interval To. The timer register 52 is reset each time of receiving the signal S1.

Accordingly, while a control current value I is stored in the duty register 50, the comparator 51 outputs a coincidence signal to reset the flip-flop 53 each time the number of the clock pulses CL counted by the timer register 52 reaches the control current value I. Since the flip-flop 53 is reset at the predetermined time interval To, the set-output signal S2 of the flip-flop 53 is output during a predetermined period T1 of time which corresponds to the control current value I, within the predetermined time interval To, as shown in FIG. 6. The set-output signal S2 is applied to the solenoid 20 of the solenoid valve 12 through the amplifier 32. Consequently, the solenoid 20 generates attractive force corresponding to an effective value of the duty output signal S2 so as to displace the spool 15 in proportion to the control current value I.

Although in the above-described embodiment, the linear solenoid valve 12 is provided to control the by-passed flow of fluid between both cylinder chambers of the power cylinder 11, it may constitute a part of a bypass way communicating with supply and exhaust passages which respectively lead to a fluid supply and a reservoir thereof. Furthermore, the linear solenoid valve 12 may be incorporated into a supply pump so that the volume of supply fluid to the power steering device 10 can be variably controlled in response to input conditions.

Moreover, although in the above-described embodiment, the input torque (TM)-output torque (TS) characteristic is controlled in response to input conditions, including vehicle speed V, steering rotary angle $\theta$ and steering rotary speed $\dot{\theta}$, so as to follow the objective characteristic, the control parameters usable in the present invention are not limited to these input conditions. Besides these input conditions, lateral acceleration, live load and so forth may be used as control parameters. Furthermore, the output torque may be detected as the pressure of fluid generated in the power cylinder 11.

Obviously, numerous modifications and variations of the present invention are possible in light of the above teachings. It is to be understood, therefore, that within the scope of the appended claims, the invention may be practiced otherwise than as specifically described herein.

What is claimed as new and desired to be secured by Letters Patents of the United States is:

1. A steering force controller for a power steering device having a fluid control system, comprising:
   a linear solenoid valve provided in said fluid control system of said power steering device for controlling an output torque relative to an input torque;
   an input torque sensor for detecting a value of said input torque applied to said power steering device;
   an output torque sensor for detecting a value of said output torque generated by said power steering device;
   auxiliary input sensing means for detecting a value of at least one auxiliary control input;
   control circuit means connected to said input torque sensor, said output torque sensor and said auxiliary input sensing means for obtaining an objective output torque value based upon said input torque value and said at least one auxiliary control input value and further, for calculating a control output value based upon said objective output torque value and said detected output torque value; and
   solenoid drive means connected to said control circuit means and said linear solenoid valve for controlling said linear solenoid valve in response to said control output value applied from said circuit means, whereby said output torque generated by said power steering device is controlled to follow said objective output torque value.

2. A steering force controller as set forth in claim 1, wherein said control circuit means includes:
   data storage means for storing a plurality of objective output torque values including said objective output torque; and
   data selector means for selecting one of said plurality of said objective output torque values based upon said input torque value and said at least one auxiliary control input value in advance of calculation of said control output value.

3. A steering force controller as set forth in claim 2, wherein said control circuit means further includes:

first calculating means for calculating a compensating value based upon said output torque value and said selected one of said plurality of said objective output torque values; and second calculating means periodically operable for calculating said control output value based upon a reference control value and said compensating value.

4. A steering force controller as set forth in claim 3, wherein said solenoid drive means is periodically operable in synchronized relation with the operation of said second calculating means and comprises:

a duty register for receiving said control output value from said second calculating means;

a flip-flop circuit periodically set for outputting a set output signal;

an amplifier connected between said flip-flop circuit and said linear solenoid valve for amplifying said set output signal thereby to drive said linear solenoid valve;

an AND gate connected to said flip-flop circuit for outputting a train of clock pulses while said flip-flop circuit outputs said set output signal;

a timer register connected to said AND gate for counting said train of said clock pulses and connected to be reset when said flip-flop circuit is set; and a comparator connected to said duty register, said timer register and said flip-flop circuit for outputting a reset signal to said flip-flop circuit when a counted value of said timer register comes into coincidence with said control output value stored in said duty register.

5. A steering force controller as set forth in claims 1, 2, 3 or 4, wherein:

said linear solenoid valve is provided for controllng bypassed flow of pressurized fluid between first and second chambers of a power cylinder provide in said power steering device.

6. A steering force controller for a power steering device having a fluid control system, comprising:

a linear solenoid valve provided in said fluid control system of said power steering device for controlling an output torque relative to an input torque;

an input torque sensor for detecting a value of said input torque applied to said power steering device;

an output torque sensor for detecting a value of said output torque generated by said power steering device;

a plurality of auxiliary input sensors for respectively detecting values of predetermined auxiliary inputs;

a multiplexer connected to said input torque sensor, said output torque sensor and said plurality of said auxiliary input sensors for selectively reading said input torque value, said output torque value and said various auxiliary input values;

an analogue-to-digital converter connected to said multiplexer for converting each of said input and said output torque values and said various auxiliary input values into a corresponding digital value;

data storage means for storing a plurality of objective output torque values;

a digital computer connected to said analogue-to-digital converter and said data storage means and operable for reading said input torque value, said output torque value and said various auxiliary input successively input from said analogue-to-digital converter, for selecting one of said plurality of said objective output torque values stored in said data storage means based upon said read input torque value and said read auxiliary input values, and for calculating a control output value based upon said selected one of said plurality of said objective output torque values and said read output torque value; and solenoid drive means connected to said digital computer and said linear solenoid valve for controlling said linear solenoid valve in response to said control output value applied from said digital computer, whereby said output torque generated by said power steering device is controlled to follow said selected one of said plurality of said objective output torque values.

7. A steering force controller as set forth in claim 6, wherein said data storage means also stores a plurality of reference control output values respectively associated with said plurality of said objective output torque values, and wherein said digital computer is programmed to execute the following steps of:

(i) reading said input torque value, said output torque value and said various auxiliary input values successively applied from said analogue-to-digital converter;

(ii) selecting said one of said plurality of said objective output torque values and an associated one of said plurality of said reference control output values based upon said read input torque value and said read various auxiliary input values;

(iii) calculating a compensating value based upon said read output torque value and said selected one of said plurality of said objective output torque values;

(iv) calculating said control output value based upon said compensating value and said selected one of said plurality of said reference control output values; and (v) outputting said control output value to said solenoid drive means.

8. A steering force controller as set forth in claim 7, wherein said solenoid drive means is periodically operable in synchronized relation with the operation of said digital computer and comprises:

a duty register for receiving said control output value from said digital computer;

a flip-flop circuit periodically set for outputting a set output signal;

an amplifier connected between said flip-flop circuit and said linear solenoid valve for amplifying said set output signal thereby to drive said linear solenoid valve;

an AND gate connected to said flip-flop circuit for outputting a train of clock pulses while said flip-flop circuit outputs said set output signal;

a timer register connected to said AND gate for counting said train of said clock pulses and connected to be reset when said flip-flop circuit is set; and a comparator connected to said duty register, said timer register and said flip-flop circuit for outputting a reset signal to said flip-flop circuit when a counted value of said timer register comes into coincidence with said control output value stored in said duty register.

* * * * *